United States Patent
Schwarz et al.

(10) Patent No.: US 10,309,232 B2
(45) Date of Patent: Jun. 4, 2019

(54) GAS TURBINE ENGINE WITH STAGE DEPENDENT MATERIAL SELECTION FOR BLADES AND DISK

(75) Inventors: Frederick M. Schwarz, Glastonbury, CT (US); Daniel Bernard Kupratis, Wallingford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 723 days.

(21) Appl. No.: 13/418,404

(22) Filed: Mar. 13, 2012

(65) Prior Publication Data

US 2013/0224049 A1 Aug. 29, 2013

Related U.S. Application Data

(60) Provisional application No. 61/604,572, filed on Feb. 29, 2012.

(51) Int. Cl.
  *F01D 5/28* (2006.01)
  *F02C 7/36* (2006.01)
  (Continued)

(52) U.S. Cl.
  CPC ............... *F01D 5/284* (2013.01); *F01D 5/28* (2013.01); *F01D 5/225* (2013.01); *F01D 5/3007* (2013.01);
  (Continued)

(58) Field of Classification Search
  CPC ... F01D 5/28; F01D 5/284; F02K 3/04; F02K 3/06; F02C 3/107
  (Continued)

(56) References Cited

U.S. PATENT DOCUMENTS 2,058,479 A * 10/1936 Lysholm .................. F01D 5/06
  415/134
3,287,906 A 11/1966 McCormick
  (Continued)

FOREIGN PATENT DOCUMENTS

EP 0980962 A2 2/2000
GB 1454233 A 11/1976
  (Continued)

OTHER PUBLICATIONS

Conference on Engineering and Physics: Synergy for Success 2006. Journal of Physics: Conference Series vol. 105. London, UK. Oct. 5, 2006.
  (Continued)

*Primary Examiner* — Todd E Manahan
*Assistant Examiner* — Eric W Linderman
(74) *Attorney, Agent, or Firm* — Carlson, Gaskey & Olds, P.C.

(57) ABSTRACT

A gas turbine engine includes a shaft defining an axis of rotation and a fan driving turbine configured to drive the shaft. The fan driving turbine comprises a plurality of stages that are spaced apart from each other along the axis. Each stage includes a turbine disk comprised of a disk material and a plurality of turbine blades comprised of a blade material. The disk material and the blade material for one of the plurality of stages is selected based on a location of the one stage relative to the other stages of the plurality of stages.

28 Claims, 3 Drawing Sheets

(51) Int. Cl.
*F02K 3/04* (2006.01)
*F02K 3/06* (2006.01)
*F02C 3/107* (2006.01)
*F01D 5/22* (2006.01)
*F01D 5/30* (2006.01)

(52) U.S. Cl.
CPC .............. *F02C 3/107* (2013.01); *F02K 3/04* (2013.01); *F02K 3/06* (2013.01); *F05D 2300/174* (2013.01); *F05D 2300/6033* (2013.01); *Y02T 50/672* (2013.01); *Y02T 50/673* (2013.01)

(58) Field of Classification Search
USPC .......... 60/805, 226.1, 262; 415/199.5, 198.1, 415/199.4, 200; 416/175, 198 R, 223 A, 416/241 B, 241 R
See application file for complete search history.

(56) References Cited

U.S. PATENT DOCUMENTS

| | | | | |
|---|---|---|---|---|
| 3,673,802 A * | 7/1972 | Krebs | ................ | F02C 3/067 415/79 |
| 3,678,555 A * | 7/1972 | Hansen | ................ | F01D 5/081 228/182 |
| 3,729,957 A * | 5/1973 | Petrie | ................ | F01D 5/022 415/122.1 |
| 3,749,514 A * | 7/1973 | Kelch | ................ | F01D 5/087 416/193 A |
| 3,754,484 A | 8/1973 | Roberts | | |
| 3,778,188 A * | 12/1973 | Aspinwall | ................ | F01D 5/183 416/231 R |
| 3,892,358 A | 7/1975 | Gisslen | | |
| 3,904,316 A * | 9/1975 | Clingman | ................ | F01D 5/28 416/218 |
| 3,940,268 A * | 2/1976 | Catlin | ................ | 419/8 |
| 3,952,391 A * | 4/1976 | Gee | ................ | B23P 15/02 29/889.2 |
| 4,005,575 A * | 2/1977 | Scott | ................ | F02K 3/04 415/61 |
| 4,051,585 A * | 10/1977 | Walker et al. | ................ | 29/889.21 |
| 4,096,615 A * | 6/1978 | Cross | ................ | B23K 35/304 228/175 |
| 4,117,669 A * | 10/1978 | Heller | ................ | F02C 7/26 415/115 |
| 4,130,872 A | 12/1978 | Harloff | | |
| 4,156,051 A * | 5/1979 | Nakamura et al. | ................ | 428/446 |
| 4,251,987 A * | 2/1981 | Adamson | ................ | F02C 3/113 417/405 |
| 4,329,175 A * | 5/1982 | Turner | ................ | B22F 5/04 419/6 |
| 4,455,891 A * | 6/1984 | Freeman | ................ | F16H 3/722 475/108 |
| 4,529,452 A * | 7/1985 | Walker | ................ | B21J 1/00 148/527 |
| 4,579,602 A * | 4/1986 | Paulonis | ................ | B21J 5/00 148/677 |
| 4,626,461 A * | 12/1986 | Prewo | ................ | C03C 14/002 428/113 |
| 4,663,241 A * | 5/1987 | Doherty | ................ | B22F 5/04 428/547 |
| 4,784,572 A * | 11/1988 | Novotny | ................ | B23K 20/00 416/198 A |
| 4,827,712 A * | 5/1989 | Coplin | ................ | F02K 3/06 415/210.1 |
| H647 H * | 7/1989 | Johnson | ................ | B23K 20/00 |
| 4,864,706 A * | 9/1989 | Jenkel | ................ | B23K 11/002 228/160 |
| 4,873,751 A * | 10/1989 | Walker | ................ | B23P 6/005 29/402.13 |
| 4,916,894 A * | 4/1990 | Adamson | ................ | F02C 3/107 416/171 |
| 4,923,370 A * | 5/1990 | Larson | ................ | F01D 5/043 415/115 |
| 5,061,154 A * | 10/1991 | Kington | ................ | F01D 5/048 29/889 |
| 5,071,312 A * | 12/1991 | Kirby | ................ | F01D 1/06 29/889.22 |
| 5,201,845 A * | 4/1993 | Allmon | ................ | F01D 25/18 184/6.23 |
| 5,307,622 A * | 5/1994 | Ciokajlo | ................ | F02C 3/067 415/65 |
| 5,378,110 A | 1/1995 | Ress, Jr. | | |
| 5,433,674 A | 7/1995 | Sheridan et al. | | |
| 5,447,411 A | 9/1995 | Curley et al. | | |
| 5,474,421 A * | 12/1995 | Rossmann | ................ | F01D 5/26 416/203 |
| 5,524,847 A | 6/1996 | Brodell et al. | | |
| 5,593,282 A * | 1/1997 | Krueger | ................ | F01D 5/225 416/219 R |
| 5,653,579 A * | 8/1997 | Glezer | ................ | F01D 5/225 415/173.1 |
| 5,660,526 A * | 8/1997 | Ress, Jr. | ................ | F01D 5/02 416/198 A |
| 5,740,668 A * | 4/1998 | Fujiwara | ................ | F01D 5/28 415/200 |
| 5,741,119 A * | 4/1998 | Heppenstall | ................ | 416/219 R |
| 5,778,659 A | 7/1998 | Duesler et al. | | |
| 5,836,742 A * | 11/1998 | Dierksmeier | ................ | F01D 5/081 416/95 |
| 5,857,836 A | 1/1999 | Stickler et al. | | |
| 5,915,917 A | 6/1999 | Eveker et al. | | |
| 5,975,841 A | 11/1999 | Lindemuth et al. | | |
| 6,127,044 A * | 10/2000 | Yamamoto | ................ | B21K 3/04 148/669 |
| 6,168,871 B1 | 1/2001 | Ritter et al. | | |
| 6,190,133 B1 * | 2/2001 | Ress, Jr. | ................ | F01D 5/147 416/223 A |
| 6,209,311 B1 * | 4/2001 | Itoh | ................ | F02C 3/13 60/226.3 |
| 6,223,616 B1 | 5/2001 | Sheridan | | |
| 6,270,914 B1 * | 8/2001 | Ogasawara | ................ | C23C 10/28 148/421 |
| 6,318,070 B1 | 11/2001 | Rey et al. | | |
| 6,499,946 B1 * | 12/2002 | Yamada | ................ | C22C 38/22 415/199.4 |
| 6,551,372 B1 | 4/2003 | Ewing et al. | | |
| 6,814,541 B2 | 11/2004 | Evans et al. | | |
| 6,895,741 B2 * | 5/2005 | Rago | ................ | F01D 15/10 60/226.1 |
| 6,969,238 B2 * | 11/2005 | Groh | ................ | B23K 20/129 415/200 |
| 7,021,042 B2 | 4/2006 | Law | | |
| 7,435,058 B2 * | 10/2008 | Campbell | ................ | F01D 5/14 416/232 |
| 7,491,032 B1 * | 2/2009 | Powell | ................ | F04D 29/023 29/889.71 |
| 7,514,810 B2 * | 4/2009 | Kern | ................ | F01D 15/10 290/52 |
| 7,591,754 B2 | 9/2009 | Duong et al. | | |
| 7,824,305 B2 | 11/2010 | Duong et al. | | |
| 7,882,693 B2 * | 2/2011 | Schilling | ................ | F02C 3/107 60/204 |
| 7,926,260 B2 | 4/2011 | Sheridan et al. | | |
| 7,971,334 B2 | 7/2011 | Walsh et al. | | |
| 8,205,432 B2 | 6/2012 | Sheridan | | |
| 8,343,402 B1 * | 1/2013 | Matsen | ................ | B29C 35/0805 264/109 |
| 8,375,699 B1 * | 2/2013 | Atassi | ................ | F02K 1/48 60/226.3 |
| 8,714,932 B2 * | 5/2014 | Noe | ................ | C04B 35/573 156/280 |
| 8,747,055 B2 * | 6/2014 | McCune | ................ | F02K 3/06 415/122.1 |
| 8,853,878 B1 * | 10/2014 | White | ................ | F02C 7/36 290/52 |
| 8,863,491 B2 * | 10/2014 | Merry | ................ | F01D 25/162 60/226.1 |

(56) References Cited

U.S. PATENT DOCUMENTS

| | | | | |
|---|---|---|---|---|
| 8,887,487 B2* | 11/2014 | Kupratis | F02C 7/36 | 416/124 |
| 9,222,417 B2* | 12/2015 | Kupratis | F02C 7/36 | |
| 9,266,170 B2* | 2/2016 | Godfrey | B23P 15/04 | |
| 9,291,064 B2* | 3/2016 | Feulner | F02C 7/047 | |
| 9,328,622 B2* | 5/2016 | Garcia-Crespo | F01D 5/303 | |
| 9,790,792 B2* | 10/2017 | Suciu | F01D 5/02 | |
| 2002/0108376 A1* | 8/2002 | Stevens | F02C 7/141 | 60/772 |
| 2002/0170176 A1* | 11/2002 | Rigney | C23C 4/00 | 29/889.1 |
| 2003/0044284 A1* | 3/2003 | Leeke | F01D 5/3007 | 416/219 R |
| 2003/0114082 A1* | 6/2003 | Jones | B23Q 3/063 | 451/28 |
| 2003/0208904 A1* | 11/2003 | Tefft | C23C 4/00 | 29/889.22 |
| 2004/0003913 A1* | 1/2004 | Ray | B22C 1/00 | 164/529 |
| 2004/0005219 A1* | 1/2004 | Phipps | F01D 5/02 | 416/219 R |
| 2004/0223850 A1* | 11/2004 | Kramer | F01D 5/147 | 416/241 R |
| 2005/0031446 A1* | 2/2005 | Ress, Jr. | F01D 11/025 | 415/173.2 |
| 2005/0076503 A1* | 4/2005 | Pickert | B23P 15/04 | 29/889.7 |
| 2005/0084381 A1* | 4/2005 | Groh | B23K 20/129 | 416/244 A |
| 2005/0241292 A1* | 11/2005 | Taylor | F01D 1/26 | 60/226.1 |
| 2006/0073019 A1* | 4/2006 | Wettstein | F01D 5/20 | 416/203 |
| 2006/0083653 A1* | 4/2006 | Das | B22F 3/15 | 419/36 |
| 2006/0130456 A1* | 6/2006 | Suciu | F01D 5/066 | 60/226.1 |
| 2006/0266050 A1* | 11/2006 | Stevens | F01D 5/081 | 60/785 |
| 2006/0280610 A1* | 12/2006 | Heyward | C22C 14/00 | 416/189 |
| 2007/0022735 A1* | 2/2007 | Henry | F02C 7/36 | 60/39.162 |
| 2007/0128360 A1* | 6/2007 | Gorman | C23C 10/02 | 427/252 |
| 2007/0207032 A1* | 9/2007 | Greim | F01D 1/04 | 415/198.1 |
| 2007/0231153 A1* | 10/2007 | Beckford | B21D 53/78 | 416/229 R |
| 2008/0098715 A1* | 5/2008 | Orlando | F02K 3/072 | 60/226.1 |
| 2008/0098718 A1* | 5/2008 | Henry | F02C 3/067 | 60/226.1 |
| 2008/0120842 A1* | 5/2008 | Wines | B23P 15/006 | 29/889.21 |
| 2008/0124210 A1* | 5/2008 | Wayte | B23P 15/006 | 415/115 |
| 2008/0141650 A1* | 6/2008 | Johnson | F01D 17/162 | 60/39.162 |
| 2008/0190095 A1* | 8/2008 | Baran | F02K 1/002 | 60/226.3 |
| 2008/0286109 A1* | 11/2008 | Keith | F01D 5/147 | 416/239 |
| 2009/0092494 A1* | 4/2009 | Cairo | F01D 5/30 | 416/204 R |
| 2009/0185911 A1 | 7/2009 | Roberge | | |
| 2009/0266912 A1* | 10/2009 | Gukeisen | F02K 1/1253 | 239/265.33 |
| 2009/0283503 A1* | 11/2009 | Schreiber | B23K 1/0018 | 219/121.64 |
| 2009/0293445 A1* | 12/2009 | Ress, Jr. | F02C 3/067 | 60/39.15 |
| 2010/0054917 A1* | 3/2010 | Razzell | F01D 11/008 | 415/119 |
| 2010/0074740 A1* | 3/2010 | Sikorski | F01D 5/28 | 415/200 |
| 2010/0089165 A1* | 4/2010 | Scarlin | G01N 29/043 | 73/632 |
| 2010/0126141 A1* | 5/2010 | Schilling | F01D 1/26 | 60/268 |
| 2010/0148396 A1 | 6/2010 | Xie et al. | | |
| 2010/0150725 A1* | 6/2010 | Krautheim | B23P 15/006 | 416/219 R |
| 2010/0159261 A1* | 6/2010 | Kirby | C04B 41/009 | 428/471 |
| 2010/0189556 A1* | 7/2010 | Propheter-Hinckley | F01D 5/284 | 415/200 |
| 2010/0329883 A1* | 12/2010 | Mourer | C22C 19/03 | 416/241 R |
| 2010/0331139 A1 | 12/2010 | McCune | | |
| 2011/0058954 A1* | 3/2011 | Hasselqvist | C22C 19/05 | 416/241 R |
| 2011/0166798 A1* | 7/2011 | Knodel | F01D 21/003 | 702/34 |
| 2011/0217175 A1* | 9/2011 | Tochitani | F01D 5/225 | 416/193 A |
| 2011/0217176 A1* | 9/2011 | Uihlein | B23K 13/01 | 416/219 R |
| 2011/0229337 A1 | 9/2011 | Carper et al. | | |
| 2012/0073263 A1* | 3/2012 | Kohlenberg | B64D 33/04 | 60/226.3 |
| 2012/0076661 A1* | 3/2012 | Farris | F01D 5/225 | 416/241 R |
| 2012/0076662 A1* | 3/2012 | Tryon | F01D 5/02 | 416/241 R |
| 2012/0171018 A1* | 7/2012 | Hasel | F02C 3/107 | 415/122.1 |
| 2012/0275904 A1* | 11/2012 | McCune | F01D 5/027 | 415/122.1 |
| 2013/0000317 A1* | 1/2013 | Berryann | F01D 19/00 | 60/778 |
| 2013/0014387 A1* | 1/2013 | Kimura | B21K 3/04 | 29/889.7 |
| 2013/0108466 A1* | 5/2013 | Suciu | F01D 5/027 | 416/96 R |
| 2013/0192200 A1* | 8/2013 | Kupratis | F02K 3/072 | 60/226.3 |
| 2013/0192201 A1* | 8/2013 | Kupratis | F01D 25/16 | 60/226.3 |
| 2013/0192258 A1* | 8/2013 | Kupratis | F02C 3/113 | 60/801 |
| 2013/0192266 A1* | 8/2013 | Houston | F02K 3/06 | 60/805 |
| 2013/0195621 A1* | 8/2013 | Schwarz | F01D 25/162 | 415/118 |
| 2013/0195645 A1* | 8/2013 | Suciu | F02K 3/06 | 415/220 |
| 2013/0195648 A1* | 8/2013 | Schwarz | F02K 3/06 | 415/229 |
| 2013/0287575 A1* | 10/2013 | McCune | F02K 3/06 | 416/170 R |
| 2013/0287590 A1* | 10/2013 | Neuhaeusler | B22F 3/1055 | 416/241 R |
| 2013/0318998 A1* | 12/2013 | Schwarz | F02C 3/113 | 60/792 |
| 2013/0320185 A1* | 12/2013 | Husband | F02K 3/06 | 248/674 |
| 2014/0112794 A1* | 4/2014 | Garcia-Crespo | F01D 5/3007 | 416/219 R |
| 2014/0130479 A1* | 5/2014 | Schwarz | F02C 7/06 | 60/226.3 |
| 2014/0196472 A1* | 7/2014 | Kupratis | F02K 3/072 | 60/805 |
| 2014/0230403 A1* | 8/2014 | Merry | F02K 3/04 | 60/226.1 |
| 2014/0248129 A1* | 9/2014 | Merry | F01D 25/162 | 415/115 |

(56) References Cited

U.S. PATENT DOCUMENTS

| | | | | |
|---|---|---|---|---|
| 2014/0260326 A1* | 9/2014 | Schwarz | ............... | F02K 3/06 60/805 |
| 2015/0118055 A1* | 4/2015 | Noble | ............... | F01D 5/3007 416/193 A |
| 2015/0192071 A1* | 7/2015 | Kupratis | ............... | F02C 7/36 60/805 |
| 2015/0204238 A1* | 7/2015 | Morin | ............... | F02K 3/04 60/725 |
| 2015/0345427 A1* | 12/2015 | Schwarz | ............... | F02K 3/06 60/226.1 |
| 2016/0003058 A1* | 1/2016 | Merry | ............... | F01D 5/34 416/182 |
| 2016/0053617 A1* | 2/2016 | Grelotti | ............... | F01D 5/34 60/805 |
| 2016/0097281 A1* | 4/2016 | Hanrahan | ............... | F04D 29/666 415/193 |
| 2016/0362990 A1* | 12/2016 | Kray | ............... | B29C 70/345 |
| 2017/0002669 A1* | 1/2017 | Szwedowicz | ............... | F01D 5/3038 |
| 2017/0122107 A1* | 5/2017 | Wackers | ............... | F01D 5/06 |
| 2017/0122256 A1* | 5/2017 | Smarsly | ............... | F01D 5/28 |
| 2017/0183782 A1* | 6/2017 | Kirby | ............... | C23C 28/3455 |
| 2017/0218768 A1* | 8/2017 | Boeck | ............... | F01D 5/08 |
| 2017/0268091 A1* | 9/2017 | Woodfield | ............... | C22F 1/183 |
| 2018/0105914 A1* | 4/2018 | Bochiechio | ............... | B23K 20/12 |

FOREIGN PATENT DOCUMENTS

| | | |
|---|---|---|
| GB | 1516041 | 6/1978 |
| GB | 2041090 | 9/1980 |
| WO | 2005056220 A1 | 6/2005 |
| WO | 2007038674 | 4/2007 |

OTHER PUBLICATIONS

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report. NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.

Dickey, T.A. and Dobak, E.R. (1972). The evolution and development status of ALF 502 turbofan engine. National Aerospace Engineering and Manufacturing Meeting. San Diego, California. Oct. 2-5, 1972.

Gunston, B. (Ed.) (2000). Jane's aero-engines, Issue seven. Coulsdon, Surrey, UK: Jane's Information Group Limited.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

(56) References Cited

OTHER PUBLICATIONS

Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8), p. 32.
Hendricks, E.S. and Tong, M.T. (2012). Performance and weight estimates for an advanced open rotor engine. NASA/TM-2012-217710.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.
Zalud, T. (1998). Gears put a new spin on turbofan performance. Machine Design, 70(20), p. 104.
Supplementary European Search Report for European Application No. 13754262.7 dated Jan. 8, 2016.
Singapore Search Report for Singapore Patent Application No. 11201404986T dated Sep. 18, 2015.
International Preliminary Report on Patentability for International Application No. PCT/US2013/026255 dated Sep. 12, 2014.

\* cited by examiner

GAS TURBINE ENGINE WITH STAGE DEPENDENT MATERIAL SELECTION FOR BLADES AND DISK

CROSS-REFERENCE TO RELATED APPLICATION

This application claims priority to U.S. Provisional Application No. 61/604,572, filed Feb. 29, 2012.

BACKGROUND OF THE INVENTION

This disclosure relates to a fan driving turbine for a gas turbine engine having a lightweight blade configuration.

A typical jet engine has multiple shafts or spools that transmit torque between turbine and compressor sections of the engine. In one example, a low speed spool generally includes a low shaft that interconnects a fan, a low pressure compressor, and a fan driving turbine. Fan driving turbine efficiency can be improved through increased speed, reduced blade/disk counts, and a reduced turbine stage count. Further, the vehicle fuel burn can be reduced because of weight reduction associated with the reduced blade/disk and stage count. The vehicle operator's savings from the reduction in fuel burn can be further enhanced by the need to buy few replacement parts as a result of the reduction in blade/disk and stage count.

SUMMARY OF THE INVENTION

In one exemplary embodiment, a gas turbine engine includes a shaft defining an axis of rotation and a fan driving turbine configured to drive the shaft. The fan driving turbine comprises a plurality of stages that are spaced apart from each other along the axis. Each stage includes a turbine disk comprised of a disk material and a plurality of turbine blades comprised of a blade material. The disk material and the blade material for at least one of the plurality of stages is selected based on a location of the one stage relative to the other stages of the plurality of stages.

In a further embodiment of the above, the disk material and blade material comprise a common material.

In a further embodiment of any of the above, the common material comprises a monolithic ceramic material.

In a further embodiment of any of the above, the disk material and blade material comprise different materials.

In a further embodiment of any of the above, at least one row of turbine blades are of a blade material comprising a ceramic matrix composite.

In a further embodiment of any of the above, at least one row of turbine blades are of a blade material comprising a forged titanium aluminide material.

In a further embodiment of any of the above, at least one row of turbine blades are of a blade material comprising a cast titanium aluminide material.

In a further embodiment of any of the above, the disk material comprises a forged powdered metal material and the blade material comprises one of a ceramic matrix composite material, a forged titanium aluminide material, or a cast titanium aluminide material.

In a further embodiment of any of the above, the disk material comprises a non-powdered metal material and the blade material comprises one of a forged titanium aluminide material or a cast titanium aluminide material.

In a further embodiment of any of the above, the blade material comprises one of a ceramic matrix composite material, a forged titanium aluminide material, or a cast titanium aluminide material.

In a further embodiment of any of the above, the disk material comprises a forged powered metal material.

In a further embodiment of any of the above, the plurality of stages comprises at least a first turbine stage and a second turbine stage located aft of the first turbine stage, and wherein the blade material of the first turbine stage comprises a first material having a first temperature capability and the blade material of the second turbine stage comprises a second material having a second temperature capability that is lower than the first temperature capability.

In a further embodiment of any of the above, the first material comprises a ceramic matrix composite material and the second material comprises a titanium aluminide material.

In a further embodiment of any of the above, the common material is selected from the group consisting of: forged powdered metal material, forged titanium aluminide, cast titanium aluminide, and a monolithic ceramic material.

In a further embodiment of any of the above, the disk material of the first turbine stage comprises a third material having a third temperature capability and the disk material of the second turbine stage comprises a fourth material having a fourth temperature capability that is lower than the third temperature capability.

In a further embodiment of any of the above, the third material comprises a forged powdered metal material and the fourth material comprises a non-powdered metal material.

In a further embodiment of any of the above, the plurality of stages further includes at least one additional turbine stage, and wherein the blade material of the additional turbine stage is common with the blade material of the first or second turbine stage.

In a further embodiment of any of the above, the disk material of the additional turbine stage is common with the disk material of the first or second turbine stage.

In a further embodiment of any of the above, the shaft is configured to drive the fan via a speed change mechanism.

In another exemplary embodiment, a gas turbine engine includes a shaft defining an axis of rotation, a geared architecture coupling the shaft to a fan, and a fan driving turbine configured to drive the shaft. The fan driving turbine comprises a plurality of stages including at least a first stage and a second stage spaced aft of the first stage along the axis. The first stage includes a first disk comprised of a first disk material having a first disk temperature capability, and includes a first set of blades comprised of a first blade material having a first blade temperature capability. The second stage includes a second disk comprised of a second disk material having a second disk temperature capability, and includes a second set of blades comprised of a second blade material having a second blade temperature capability. The first disk temperature capability is higher than the second disk temperature capability and the first blade temperature capability is higher than the second blade temperature capability.

In a further embodiment of any of the above, the first blade material comprises a ceramic matrix composite material and the second blade material comprises a forged or cast titanium aluminide.

In a further embodiment of any of the above, the first disk material comprises a forged powdered metal material and the second disk material comprises a forged non-powdered metal material.

In a further embodiment of any of the above, the plurality of turbine stages further includes at least one additional turbine stage, and wherein a blade material of the additional stage is common with the first blade material, and wherein a disk material of the additional turbine stage is common with the first disk material.

In a further embodiment of any of the above, the plurality of turbine stages further includes at least one additional turbine stage, and wherein a blade material of the additional stage is common with the second blade material, and wherein a disk material of the additional turbine stage is common with the second disk material.

An exemplary method of assembling a gas turbine engine comprising the steps of: (a) providing a shaft defining an axis of rotation; (b) providing a fan driving turbine configured to drive the shaft, the fan driving turbine comprising a plurality of stages spaced apart from each other along the axis, wherein each stage includes: (i) a turbine disk comprised of a disk material and (ii) a plurality of turbine blades comprised of a blade material; (c) selecting the disk material and the blade material for one of the plurality of stages based on a location of the one stage relative to the other stages of the plurality of stages; and (d) assembling the stage from step (c) to the shaft at the location.

These and other features of this application will be best understood from the following specification and drawings, the following of which is a brief description.

DETAILED DESCRIPTION

A gas turbine engine 20 is disclosed herein as a two-spool turbofan (shown in FIG. 1) or three spool turbofan (not shown) that generally incorporates a fan section 22, a compressor section 24, a combustor section 26 and a turbine section 28. The compressor section 24 includes both a low pressure (or first) compressor section 44 and a high pressure (or second) compression section 52. The turbine section 28 may include two turbines in a two spool engine (e.g., a high pressure (or second) turbine section 54 and a low pressure (or first) turbine section 46, as shown) or three turbines in a three spool engine. Both two and three spool architectures include a fan driving turbine as the last turbine in the turbine section, i.e., the low pressure turbine section 46 in FIG. 1. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three or more-spool architectures. As used herein, a "high pressure" compressor or turbine experiences a higher pressure than a corresponding "low pressure" compressor or turbine.

Figure 1:
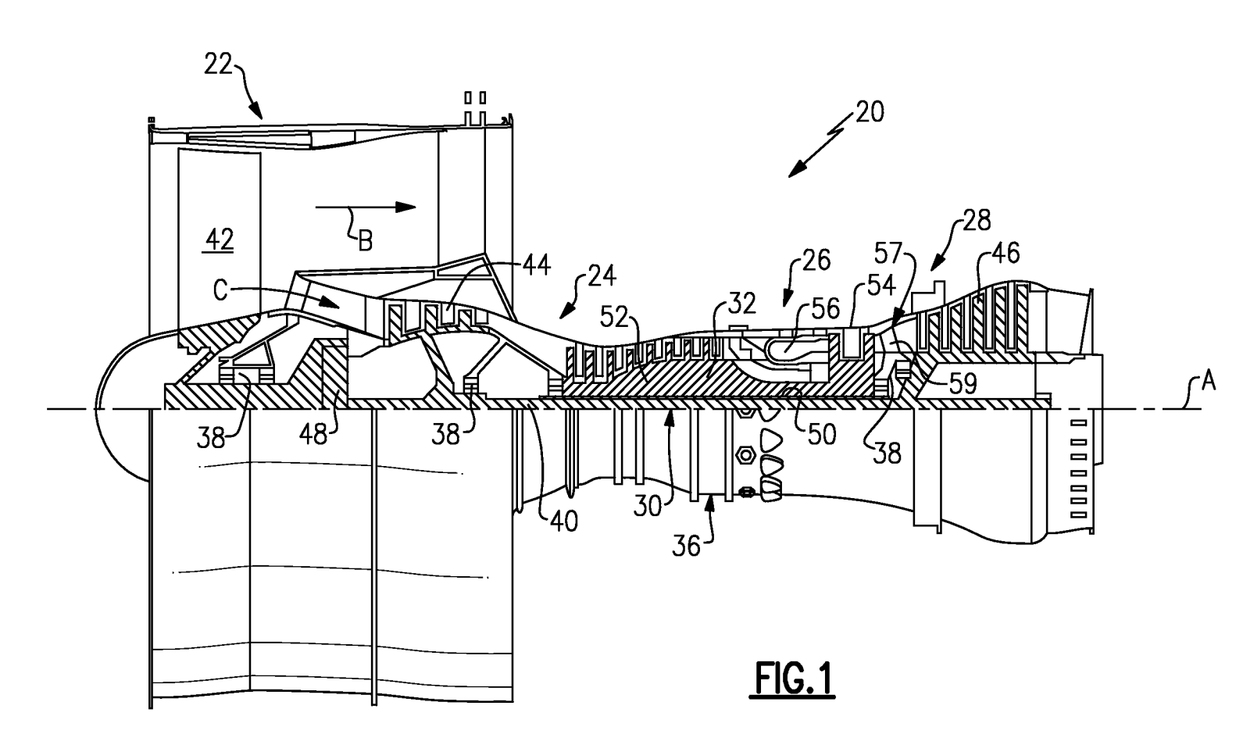
FIG. 1 schematically illustrates a gas turbine engine.

The engine 20 generally includes a lower speed section 30 and a higher speed section 32 with separate spool or spools mounted for rotation about an engine central longitudinal axis A relative to an engine static structure 36 via several bearing systems 38. It should be understood that various bearing systems 38 at various locations may alternatively or additionally be provided.

The fan drive turbine 46 generally includes an inner shaft 40 that interconnects a fan 42. Additionally, in some engine embodiments, e.g., the embodiment shown in FIG. 1, the fan drive turbine 46 will also drive a low pressure compressor 44. The inner shaft 40 of the fan drive turbine 46 in the embodiment of FIG. 1 is connected to the fan 42 through a speed change mechanism, such as a geared architecture 48 for example, to drive the fan 42 at a lower speed than the fan drive turbine 46 and the low pressure compressor section 44. The high speed section 32 includes an outer shaft 50 that interconnects the high pressure compressor section 52 and high pressure turbine section 54. Turbines other than the fan driving turbines can be included to turn other parts of the compressor section. A combustor 56 provided in the combustion section 26 is arranged between the high pressure compressor section 52 and the high pressure turbine section 54. A mid-turbine frame 57 of the engine static structure 36 is arranged generally between the high pressure turbine section 54 and the fan driving turbine 46. The mid-turbine frame 57 supports one or more bearing systems 38 in the turbine section 28. The fan drive turbine shaft 40 is concentrically inside the other shaft or shafts 50; all of the shafts 40, 50 rotate via bearing systems 38 about the engine central longitudinal axis A, which is collinear with their longitudinal axes.

The core airflow C is compressed by the low and high pressure compressor sections 44, 52 of the compressor section 24, mixed and burned with fuel in the combustor 56, then expanded over the high pressure turbine section 54 and the fan driving turbine 46. The mid-turbine frame 57 includes airfoils 59 which are in the core airflow path C to optimally present the gaspath flow from the high pressure turbine section 54 to the first blades of the fan drive turbine section 46. The turbines 46, 54 rotationally drive the respective low speed spool 30 and higher speed spools 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the fan driving turbine 46 has a pressure ratio that is greater than about 5. In one disclosed embodiment, the engine 20 bypass ratio is greater than about ten (10:1), the fan diameter is significantly larger than that of the low pressure compressor 44, and the fan driving turbine 46 has a pressure ratio that is greater than about 5:1. Fan driving turbine 46 pressure ratio is pressure measured prior to inlet of fan driving turbine 46 as related to the pressure at the outlet of the fan driving turbine 46 prior to an exhaust nozzle. The geared architecture 48 may be an epicycle gear train, such as a planetary gear system or star or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed centering on a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned per hour divided by lbf of thrust the engine produces at that minimum point. "Low fan pressure ratio" is the pressure ratio across the fan blade alone, without a fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Figure 2:
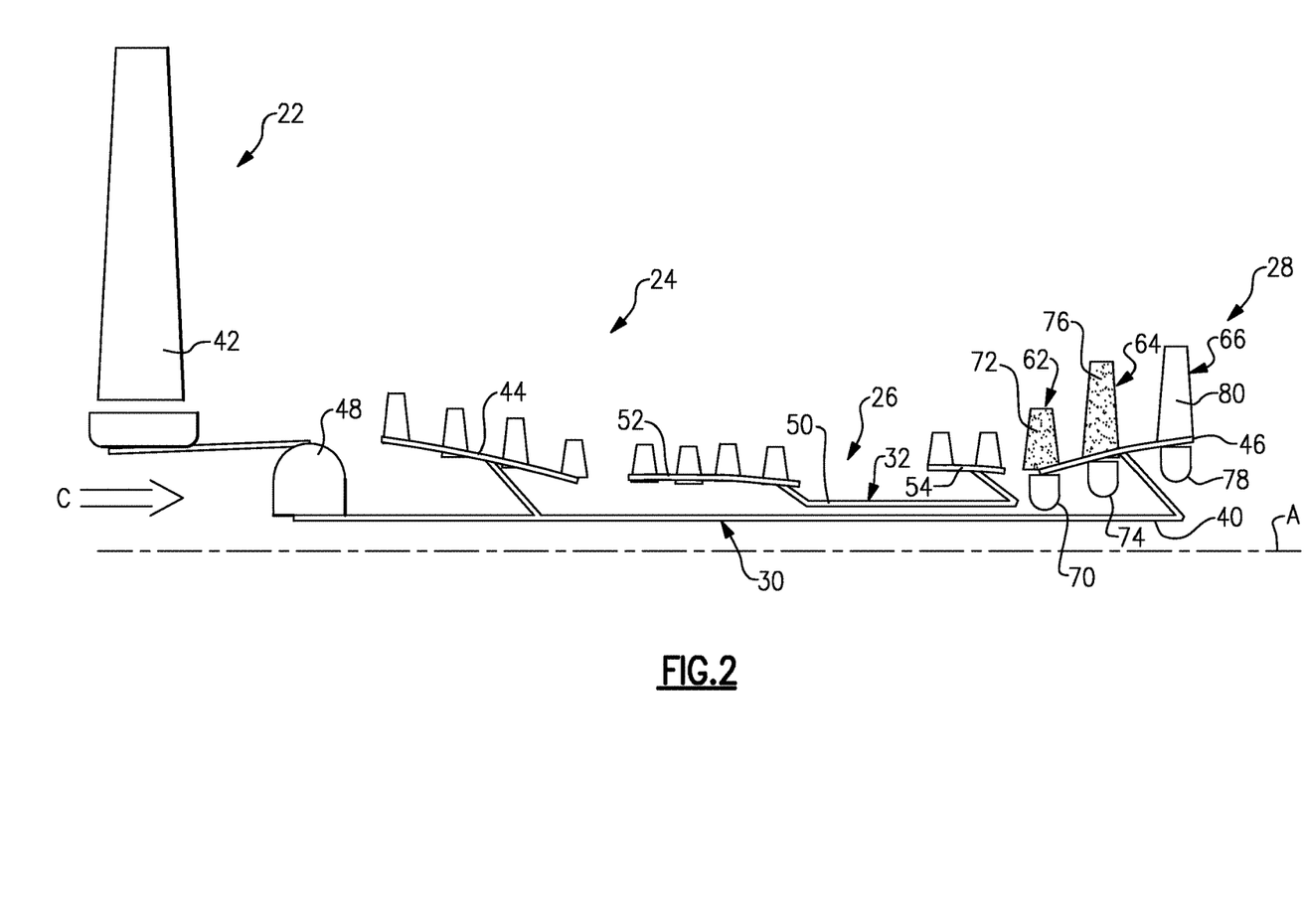
FIG. 2 is a schematic representation of an engine upper half including a fan driving turbine with a lightweight architecture.

A gas turbine engine 60 shown in FIG. 2 includes a two-spool turbofan as described above, which generally incorporates a fan section 22, a compressor section 24, a combustor section 26 and a turbine section 28. In this configuration, the fan driving turbine 46 is comprised of a lightweight architecture that allows a significant increase of turbine speed. The fan driving turbine 46 is comprised of a plurality of stages. In the example shown, the fan driving turbine includes a first stage 62, a second stage 64, and a third stage 66. It should be understood that while three stages are shown, a two stage configuration could also be utilized depending upon the application.

Figure 3:
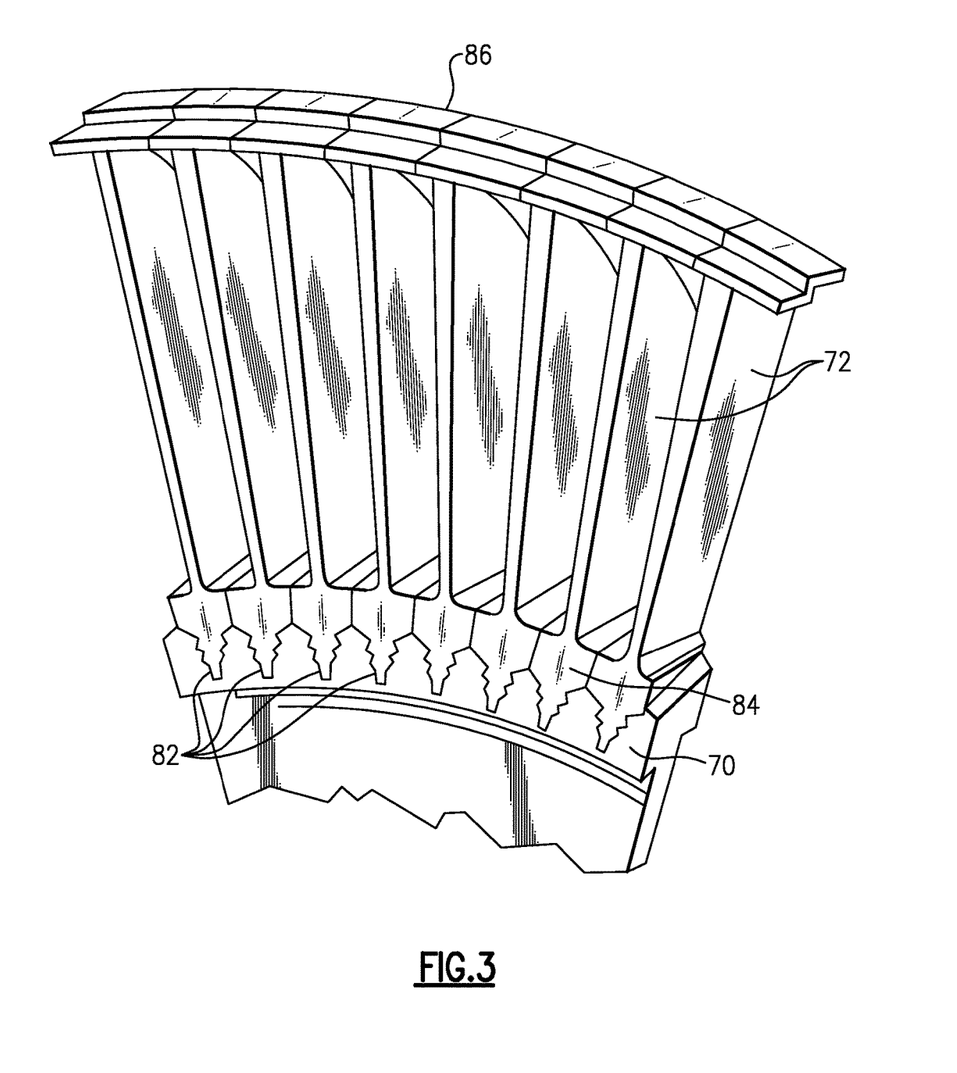
FIG. 3 is a schematic perspective representation of a portion of a turbine disk and blade assembly.

Each stage 62, 64, 66 includes a turbine disk comprised of a disk material. Each disk is associated with a plurality of turbine blades comprised of a blade material. In the example shown, the first stage 62 includes a first disk 70 which is associated with a first plurality of blades 72 as shown in FIG. 3. The second 64 and third 66 stages have a similar configuration to that of FIG. 3. The second stage includes a second disk 74 associated with a second plurality of blades 76 and the third stage 66 includes a third disk 78 associated with a third plurality of blades 80.

As shown in FIG. 3, the disk 70 includes a plurality of slots 82 that receive roots 84 of the associated blades 72. An outer shroud 86 is associated with distal ends of the blades 72. It should be understood that the disk/blade configuration shown in FIG. 3 is merely one example, and that other configurations could also be used.

As discussed above, each of the disks 70, 74, 78 is comprised of a disk material and each of the blades 72, 76, 80 is comprised of a blade material. The disk material and the blade material for an associated stage 62, 64, 66 are each selected based on a location of that stage relative to the other stages. In other words, the materials used in each stage are selected based on a location of that stage within the core flow C of the engine. This is because upstream stages are subjected to higher temperatures within the core flow C due to their proximity to the combustor section 26.

In order to advantageously increase the speed capability of the fan driving turbine 46, to make the turbine smaller in diameter, to reduce the number of stages and the number of airfoils, and to make the entire turbine shorter and lighter, the upstream stages, i.e. the stages closest to the combustor section 26, may be comprised of a lightweight high temperature material for both the associated disk and blades. For example, the first stage 62, which is the most upstream stage of the three stages 62, 64, 66, has the disk 70 comprised of a powdered metal material to withstand the temperature in the engine and blades 72 comprised of a ceramic matrix composite material. In one example, the disk 70 comprises a powdered metal forging and the blades 72 are cast of a ceramic material and machined or formed from a ceramic matrix composite. Any type of powdered metal material and any type of ceramic matrix composite material can be used.

In another example, both the disk 70 and blades 72 are formed of a monolithic ceramic material and the entire rotor section is one piece. In this example, the disk 70 and blades 72 comprise a single-piece, monolithic cast ceramic structure.

In one example, the second stage 64, which is positioned downstream of the first stage 62 and upstream of the third stage 66, includes a second disk 74 and second blades 76 made from similar materials to that of the first stage 62. For example, the second disk 74 is a powdered metal forging and the second blades 76 are comprised of a cast ceramic matrix composite material. Optionally, the disk 74 and blades 76 could be a monolithic structure comprised of a cast ceramic material.

In one example, the third stage 66, which is downstream of the second stage 64, has a third disk 78 and third blades 80 made from a material different than that of the first stage 62. For example, the third blades 80 are comprised of a forged titanium aluminide material and the third disk 78 is comprised of a non-powdered metal material. For example, the third disk 78 could be made from a conventional disk material.

In another example, a cast titanium aluminide blade is used for reduced cost, if the rotor speed is lower or the gas path temperatures are lower so as to allow the use of such a lower strength titanium aluminum alloy.

In one example, the third stage 66 is made from a material that has a lower temperature capability as compared to materials used in the first 62 and second 64 stages. This is because the third stage 66 is positioned at a cooler location within the core flow C relative to the first 62 and second 64 stages, which are positioned closer to the combustor section 26. Thus, the blade material of the more upstream stages comprises a material having a higher temperature capability than the blade material of downstream stages. Using a titanium aluminide material for the third blades and a conventional material for the third disk is less expensive than using the high temperature capability materials of the first and second stages.

Further, in another example, the second stage 64 could include blade and disk materials that are common with the third stage 66. This could be used in a configuration where the second stage 64 is located in a sufficiently lower temperature region as compared to the first stage 62. Also, if all three stages are in a high temperature region, all three stages may have disk and blade materials common with those of the first stage described above. Additional stages beyond the three stages could use either the higher temperature ceramic matrix composite materials or the cast or forged titanium aluminide materials for the blades.

As known, the discs 70, 74, 78 and associated blades 72, 76, 80 are configured to drive the low shaft 40, which in turn may also drive the lower pressure compressor 44. The low shaft 40 also drives the fan 42 via the geared architecture 48.

The configuration shown in FIG. 2 provides for improved efficiency in the fan driving turbine 46 as the lightweight rotors made from lightweight materials are capable of turning at very high speeds by reducing the pull on the blade neck and on the disk rotor. Further, using higher speeds in combination with smaller turbine annular passage and high speed reduction devices, these lightweight materials allow the number of stages and the number of blades to be reduced. This facilitates a further speed increase due to the reduction in weight by eliminating stages. For example, a fan driving turbine 46 with only three stages 62, 64, 66, such as that shown in FIG. 3, can be more efficiently operated than a lower pressure turbine 46 with four or more stages, such as the example shown in FIG. 1 because there is less handling of the fluid through multiple blade rows and there is less leakage through the blade and vane seals.

Optionally, the fan driving turbine may only require two stages. In this example, the upstream stage would be comprised of materials similar to that of the first stage 62 discussed above, and the downstream stage may be comprised of materials similar to that of the third stage 66. However, due to proximity to the combustor, both stages in a two-stage configuration could be comprised of materials similar to those of the first stage 62 described above.

An exemplary method of assembling a gas turbine engine comprises selecting the disk material and the blade material for one of the plurality of stages based on a location of that stage relative to the other stages of the plurality of stages. That stage is then assembled to the low shaft 40 at the location. For example, for a first stage 62, which is located at the most upstream location relative to the other stages 64, 66, higher temperature capability materials are selected for the disk and blades. The disk and blade material for the next stage is also selected based on the location of that stage relative to the other stages. For example, for a second stage 64 or a third stage 66, which are located downstream of the first stage 62, lower temperature capability materials may be selected for the disks and blades.

The fan driving turbine can be comprised of any number of turbine stages. Depending upon the location of these stages, they may or may not require the higher temperature capability materials. Generally, the stages closer to the combustion section will require expensive, higher temperature capable materials while the downstream stages will not require these more expensive materials. However, any combination of high temperature stages and lower temperature stages can be utilized depending upon the engine application.

It should be understood that the temperature capability of the different materials between stages is a relative measure. In other words, all of the stages could be understood to be formed from materials having high temperature capability. However, in the disclosed examples, the stage at the most upstream location is comprised of a material that has a higher temperature capability than a downstream stage.

The disclosed fan driving turbine provides improved efficiency by providing a configuration that can handle increased speed. Further, as discussed above, the configuration reduces blade and stage count. In addition to the turbomachinary-based benefit of speed, the reduction in blade and stage count reduces cumulative boundary layer flow and tip seal leakage. The speed change mechanism of the geared architecture reduces the otherwise very high speed of the fan driving turbine. The speed change mechanism can comprise an epicyclic gearbox and may comprise a star or planet type, for example. The compactness of the back end of this configuration also benefits nacelle lines and nacelle-to-wing blockage and nacelle aerodynamics.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A gas turbine engine comprising:
at least a first shaft and a second shaft rotating at a higher speed than the first shaft, wherein the first and second shafts rotate about an engine axis of rotation;
a geared architecture coupling the first shaft to a fan;
at least a first driving turbine configured to drive the first shaft and a second driving turbine to drive the second shaft, wherein the first driving turbine is positioned downstream of the second driving turbine such that the second driving turbine comprises a high pressure turbine and the first driving turbine comprises a low pressure turbine;
a combustor positioned immediately upstream of the second driving turbine; and
wherein the low pressure turbine comprises a plurality of stages including at least a first turbine stage and a second turbine stage spaced immediately aft of the first turbine stage along the axis, wherein the first turbine stage has a first temperature capability that is higher than a second temperature capability of the second turbine stage, and wherein each of the first and second turbine stages of the low pressure turbine are comprised of:
a turbine disk comprised of a disk material; and
a plurality of turbine blades comprised of a blade material, wherein the disk material for at least one of the first and second turbine stages is different than the blade material for the at least one of the first and second turbine stages, and
wherein the disk material and the blade material for the first and second turbine stages are selected independently of each other based on operational temperatures at each stage's respective location along the first shaft of the first and second turbine stages.

2. The gas turbine engine according to claim 1, wherein the plurality of turbine blades for at least one of the first and second turbine stages are of a blade material comprising a ceramic matrix composite.

3. The gas turbine engine according to claim 1, wherein the plurality of turbine blades of the second turbine stage are of a blade material comprising a forged titanium aluminide material.

4. The gas turbine engine according to claim 1, wherein the plurality of turbine blades of the second turbine stage comprise forged or cast titanium aluminide blades.

5. The gas turbine engine according to claim 1, wherein the disk material of at least one the first and second turbine stages comprises a forged powdered metal material and the blade material of at least one the first and second turbine stages comprises one of a ceramic matrix composite material, a forged titanium aluminide material, or a cast titanium aluminide material.

6. The gas turbine engine according to claim 1, wherein the disk material of the second turbine stage comprises a non-powdered metal material and the blade material of the second turbine stage comprises one of a forged titanium aluminide material or a cast titanium aluminide material.

7. The gas turbine engine according to claim 1, wherein the blade material of at least one the first and seconds turbine stages comprises one of a ceramic matrix composite material, a forged titanium aluminide material, or a cast titanium aluminide material.

8. The gas turbine engine according to claim 1, including a compressor section upstream of the combustor, the compressor section driving air along a core flowpath, and wherein the fan drives air along a bypass flowpath.

9. The gas turbine engine according to claim 1, wherein the turbine disk of at least one the first and second turbine stages includes a plurality of slots to receive the plurality of turbine blades, and wherein distal ends of each of the plurality of turbine blades is associated with a shroud.

10. The gas turbine engine according to claim 1, wherein the low pressure turbine comprises the aftmost turbine in the gas turbine engine.

11. The gas turbine engine according to claim 1, wherein the plurality of turbine stages includes a third turbine stage spaced immediately aft of the second turbine stage, and wherein the third turbine stage has a third temperature capability that is less than the first temperature capability.

12. The gas turbine engine according to claim 11, wherein the plurality of turbine blades for the first turbine stage is comprised of a ceramic matrix composite material and wherein the plurality of turbine blades for at least one of the second and third turbine stages is comprised of titanium aluminide material.

13. The gas turbine engine according to claim 12, wherein the disk material for the first turbine stage is comprised of a powdered metal material and wherein the disk material for at least one of the second and third turbine stages is comprised of a non-powdered metal material.

14. A gas turbine engine comprising:
at least a first shaft and a second shaft rotating at a higher speed than the first shaft, wherein the first and second shafts rotate about an engine axis of rotation;
a geared architecture coupling the first shaft to a fan;
at least a first driving turbine configured to drive the first shaft and a second driving turbine to drive the second shaft, wherein the first driving turbine is positioned downstream of the second driving turbine such that the second driving turbine comprises a high pressure turbine and the first driving turbine comprises a low pressure turbine;
a combustor positioned upstream of the second driving turbine; and
wherein the low pressure turbine comprises a plurality of turbine stages including at least a first turbine stage and a second turbine stage spaced immediately aft of the first turbine stage along the axis,
wherein the first turbine stage includes a first disk comprised of a first disk material having a first disk temperature capability and a first set of blades comprised of a first blade material having a first blade temperature capability,
wherein the second turbine stage includes a second disk comprised of a second disk material different from the first disk material and having a second disk temperature capability, and a second set of blades comprised of a second blade material different from the first blade material and having a second blade temperature capability, and
wherein the first disk temperature capability is higher than the second disk temperature capability and the first blade temperature capability is higher than the second blade temperature capability.

15. The gas turbine engine according to claim 14, wherein the high pressure turbine includes at least two stages, and wherein the plurality of turbine stages of the low pressure turbine comprises at least three stages, and wherein the low pressure turbine comprises the aftmost turbine in the gas turbine engine.

16. The gas turbine engine according to claim 14, including a compressor section upstream of the combustor, the compressor section driving air along a core flowpath, and wherein the fan drives air along a bypass flowpath.

17. The gas turbine engine according to claim 14, wherein the first disk includes a first plurality of slots to receive the first set of blades and the second disk includes a second plurality of slots to receive the second set of blades, and wherein distal ends of each of the first and second sets of blades is associated with a shroud.

18. The gas turbine engine according to claim 14, wherein the first disk material comprises a powdered metal material and the second disk material comprises a non-powdered metal material.

19. The gas turbine engine according to claim 14, wherein the first blade material comprises a ceramic material and the second blade material comprises a titanium aluminide material.

20. The gas turbine engine according to claim 14, wherein the first disk material is comprised of a powdered metal material and the first blade material is comprised of a ceramic matrix composite material, and wherein the second disk material is comprised of a non-powdered metal material and the second blade material is comprised of a titanium aluminide material.

21. The gas turbine engine according to claim 20, including a third turbine stage spaced immediately aft of the second turbine stage along the axis, wherein the third turbine stage includes a third disk comprised of a third disk material different from the first and second disk materials and having a third disk temperature capability, and a third set of blades comprised of a third blade material different from the first and second blade materials and having a third blade temperature capability, and wherein the second disk temperature capability is higher than the third disk temperature capability and the second blade temperature capability is higher than the third blade temperature capability.

22. The gas turbine engine according to claim 21, wherein the third blade material is comprised of a forged titanium aluminide material and the third disk material is comprised of a non-powdered metal material.

23. A gas turbine engine comprising:
at least a first shaft and a second shaft rotating at a higher speed than the first shaft, wherein the first and second shafts rotate about an engine axis of rotation;
a geared architecture coupling the first shaft to a fan;
at least a first driving turbine configured to drive the first shaft and a second driving turbine to drive the second shaft, wherein the first driving turbine is positioned downstream of the second driving turbine such that the second driving turbine comprises a high pressure turbine and the first driving turbine comprises a low pressure turbine;
a combustor positioned upstream of the second driving turbine; and
wherein the low pressure turbine comprises a plurality of turbine stages including at least a first turbine stage, a second turbine stage spaced immediately aft of the first turbine stage along the axis, and a third turbine stage spaced immediately aft of the second turbine stage along the axis,
wherein the first turbine stage includes a first disk comprised of a first disk material having a first disk temperature capability and a first set of blades comprised of a first blade material having a first blade temperature capability,
wherein the second turbine stage includes a second disk comprised of a second disk material having a second disk temperature capability and a second set of blades comprised of a second blade material having a second blade temperature capability, wherein the third turbine stage includes a third disk comprised of a third disk material having a third disk temperature capability and a third set of blades comprised of a third blade material having a third blade temperature capability, wherein the first, second, and third disk materials comprises at least two different materials, wherein the first, second, and third blade materials comprises at least two different materials, and wherein the first and second disk temperature capability is higher than the third disk temperature capability and the first and second blade temperature capability is higher than the third blade temperature capability.

24. The gas turbine engine according to claim 23, wherein the first and second disk materials comprise the same material and the third disk material comprises a different material from the first and second disk materials.

25. The gas turbine engine according to claim 23, including a compressor section upstream of the combustor, the compressor section driving air along a core flowpath, and wherein the fan drives air along a bypass flowpath.

26. The gas turbine engine according to claim 23, wherein the first disk and second disk material comprises a powdered metal material and the third disk material comprises a non-powdered metal material.

27. The gas turbine engine according to claim 26, wherein the first blade material and second blade material comprises a ceramic material and the third blade material comprises a titanium aluminide material.

28. The gas turbine engine according to claim 23, wherein the low pressure turbine comprises the aftmost turbine in the gas turbine engine.

* * * * *